Figure 1:
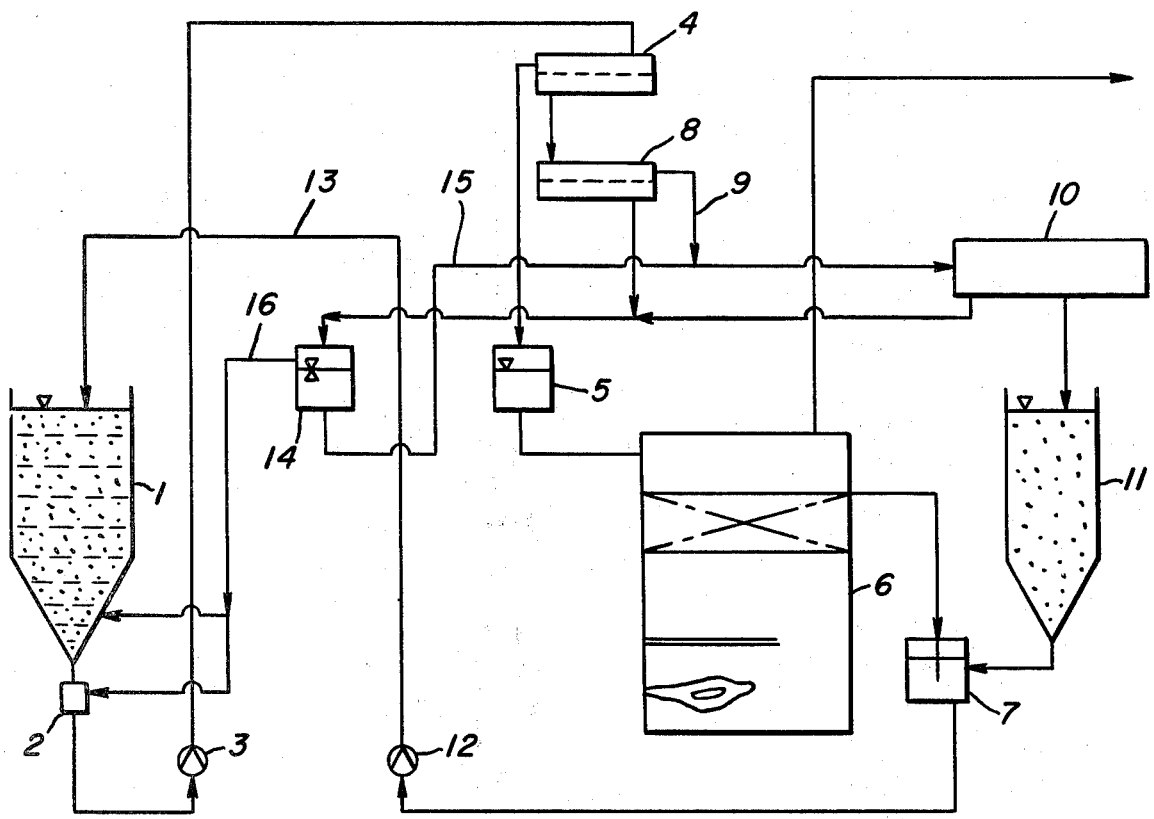

United States Patent [19]

Hahn et al.

[11] 4,177,139
[45] Dec. 4, 1979

[54] PROCESS FOR TREATING PARTICLES OF ADSORBENT USED TO REMOVE PHENOL FROM WASTE WATER

[75] Inventors: Ulrich Hahn, Dortmund; Klaus Stumpe, Essen, both of Fed. Rep. of Germany

[73] Assignee: C. Otto & Comp. G.m.b.H., Bochum, Fed. Rep. of Germany

[21] Appl. No.: 870,389

[22] Filed: Jan. 18, 1978

[30] Foreign Application Priority Data

Jan. 18, 1977 [DE] Fed. Rep. of Germany ..... 27018151

[51] Int. Cl.$^2$ ............................................. B01D 15/06
[52] U.S. Cl. ....................................... 210/33; 210/40; 252/417
[58] Field of Search ............. 209/17; 210/30 R, 30 A, 210/33, 39, 40; 252/416–419, 421, 445; 568/758

[56] References Cited

U.S. PATENT DOCUMENTS

| 2,254,745 | 9/1941 | Jannek | 568/758 |
|---|---|---|---|
| 2,343,165 | 2/1944 | Adler | 568/758 |
| 3,537,657 | 11/1970 | Henne et al. | 209/17 |
| 3,843,559 | 10/1974 | Repik et al. | 252/421 |
| 3,998,731 | 12/1976 | Franzen et al. | 210/40 |

FOREIGN PATENT DOCUMENTS 2436792 2/1976 Fed. Rep. of Germany .

*Primary Examiner*—Charles N. Hart
*Assistant Examiner*—Ivars Cintins
*Attorney, Agent, or Firm*—Thomas H. Murray; Clifford A. Poff

[57] ABSTRACT

A process for regenerating an adsorbent made of active carbon or aluminum oxide is characterized by resizing an undersized fraction of adsorbent before a regeneration process to maintain a given nominal particle size of adsorbent in an adsorber. In the regeneration process, adsorbent discharged from the adsorber is drained of waste water by feeding the adsorbent onto a screen and obtaining therefrom a first adsorbent fraction consisting of particles with a given nominal particle size and an undersized second adsorbent fraction consisting of particles greater than 10% of the given nominal particle size. The first adsorbent fraction is fed into a fluidized-bed oven for regeneration. The undersized second adsorbent fraction is fed into a processing plant for processing to define the desired given nominal particle size. The processed adsorbent particles and the regenerated adsorbent particles are returned to the adsorber. A further embodiment of the invention provides that the regenerated and processed adsorbent particles are fed onto a pair of superimposed screens for separation so that only particles having a size greater than 50% of the given nominal particle size are returned to the adsorber while the remaining adsorbent particles are subdivided into parts consisting of particles having a size greater than 15%, but less than 50%, of the given nominal particle size which are fed directly to the processing plant and a second part consisting of dust-like particles, less than 15% of the given nominal particle size, admixed with the conveying water. The aqueous mixture of dust-like adsorbent particles is fed to a separator for removing water therefrom which is returned to the adsorber. The dust-like particles are fed to the processing plant for providing the desired particle size.

6 Claims, 2 Drawing Figures

PROCESS FOR TREATING PARTICLES OF ADSORBENT USED TO REMOVE PHENOL FROM WASTE WATER

BACKGROUND OF THE INVENTION

This invention relates to a process for removing phenol from waste water by using an adsorbent which can be regenerated, and more particularly to such a process wherein the adsorbent consisting of active carbon or aluminum oxide is regenerated by removing the adsorbent from an adsorber and draining on a separator screen from where undersized particles are resized and particles having the desired particle size are fed into a fluidized-bed oven for regeneration after which the resized and regenerated adsorbent particles are pumped into the adsorber.

One method of regenerating an adsorbent discharged from an adsorber is disclosed in West German Pat. Publication No. 2,436,792. In this known method, a mixture of water and adsorbent particles is fed from an adsorber onto a bar screen for the separation of the conveying water from the active carbon adsorbent. The adsorbent is then fed into a fluidized-bed oven for regeneration while the conveying water is returned to the adsorber.

It has been discovered that the losses of active carbon in the regeneration process are relatively high, particularly during the treatment in a fluidized-bed oven. Such losses are particularly undesirable because they seriously affect the economics of the process.

SUMMARY OF THE INVENTION

It is an object of the present invention to provide a process for regenerating an adsorbent used for removing phenol from waste water wherein losses to the adsorbent during regeneration are reduced by at least 50% as compared with known methods of regenerating the adsorbent.

It is a further object of the present invention to provide a process for regenerating an adsorbent used for removing phenol from waste water wherein the adsorbent together with water is removed from the adsorber and separated to recover an undersized adsorbent fraction consisting of adsorbent particles having a size less than 10% of the desired particle size for processing in a plant to provide adsorbent particles having a desired particle size for return to the adsorber together with a regenerated fraction of adsorbent particles passed through a fluidized-bed oven and having a desired particle size.

More specifically, there is provided in a process for removing phenol from waste water by passing phenol-bearing waste water through an adsorber filled with an adsorbent of active carbon or aluminum oxide having a given nominal particle size, a process according to the present invention for regenerating the adsorbent which includes the steps of discharging the adsorbent from the adsorber and draining waste water from the discharged adsorbent, separating the adsorbent into a first adsorbent fraction consisting of adsorbent particles having the given nominal particle size and into an undersized second adsorbent fraction consisting of adsorbent particles greater than 10% of the given nominal particle size, feeding the first adsorbent fraction into a regenerator oven, regenerating the first adsorbent fraction by heating within the regenerator oven, feeding the undersized second adsorbent fraction into a processing plant, processing the undersized second adsorbent fraction in the processing plant until the processed adsorbent particles define the given nominal particle size, and returning the regenerated adsorbent particles together with the processed adsorbent particles into an adsorber.

In one embodiment of the invention, the adsorbent withdrawn from the adsorber is pumped onto a screen for separating the adsorbent particles into a fraction consisting of particles with a size greater than 50% of the desired nominal particle size which fraction is regenerated by the introduction of the adsorbent into a fluidized-bed oven. The fraction of adsorbent particles remaining in the conveying fluid passed through the separator screen is subjected to further separation by feeding the particle-bearing conveying fluid onto a further screen where further separation occurs to provide an undersized adsorbent particle fraction consisting of adsorbent particles having a size which is greater than 10% of the desired nominal particle size. The undersized adsorbent particle fraction is processed to provide particles having the desired nominal particle size which are then returned together with the regenerated adsorbent particles into the adsorber. The liquid passed through the aforementioned screens includes entrained dust-like adsorbent particles which are fed to the adsorber and flushed with purified water.

In the preferred embodiment of the invention, adsorbent particles consisting of processed adsorbent particles and regenerated adsorbent particles are fed into a separator before the adsorbent particles are returned to the adsorber. One part of the particles obtained from this separator consists of adsorbent particles having a particle size which is greater than 50% of the desired nominal particle size and these particles are fed into the adsorber. A second part of the adsorbent particles obtained from the separator consists of adsorbent particles having a particle size which is greater than 15%, but less than 50%, of the desired nominal particle size and these particles are fed to the processing plant for treatment therein to provide an adsorbent with the desired nominal particle size. The third part of the adsorbent obtained from the separator consists of adsorbent particles having a particle size less than 10% of the desired nominal particle size. These particles are entrained in a conveying fluid and are fed to a separator for the separation of the particles from the conveying fluid after which the separated adsorbent particles are fed into the processing plant for providing adsorbent particles having the desired nominal particle size.

According to a further feature of the present invention, undersized adsorbent particles having a particle size less than 15% of the desired nominal particle size are recovered from the adsorbent particles fed to the separator incident to their return into the adsorber. These undersized adsorbent particles are recovered in a further separator from water used as the conveying medium which is purified by the separation process and returned to the adsorber.

An outstanding and important feature of the invention resides in the fact that undersized adsorbent fractions are separated from the adsorbent before the return thereof to the adsorber in a manner such that the undersized adsorbent particles are not fed to a regenerator oven such as a fluidized-bed oven, but instead the undersized adsorbent particles are processed separately in the processing unit so as to supply adsorbent particles having the desired nominal particle size. In this manner, the losses of adsorbent are unexpectedly reduced by 75% or more as compared with known processes to treat adsorbent particles.

Figure 2:
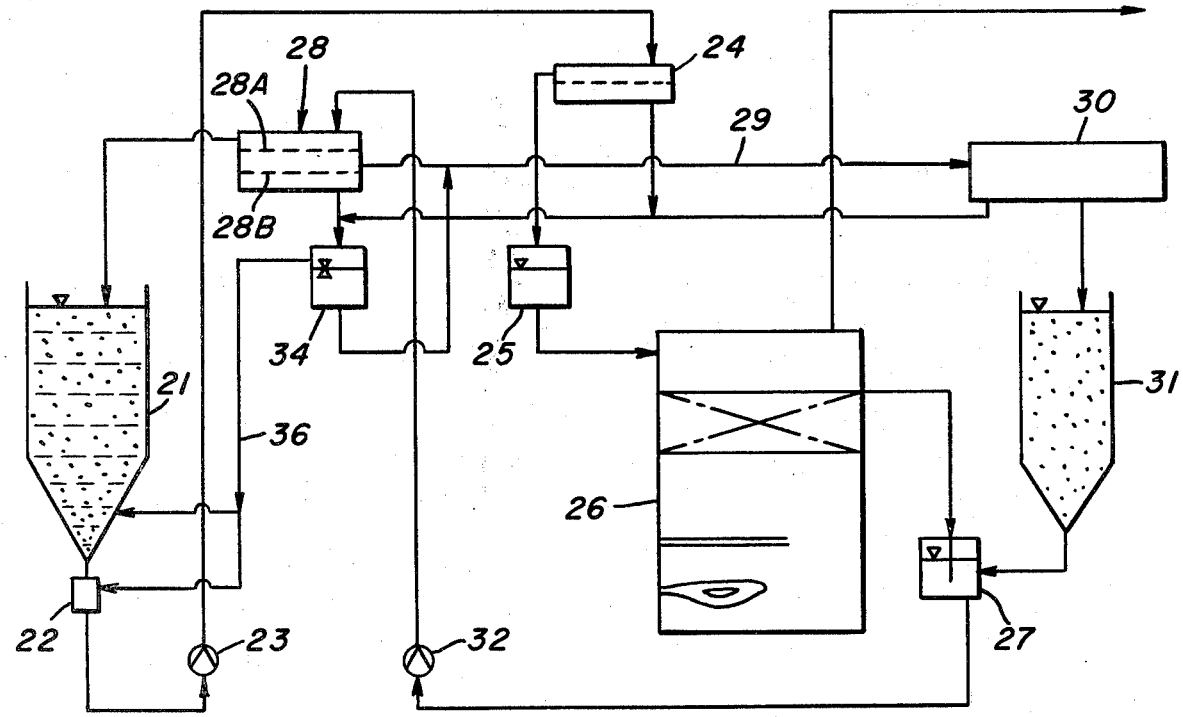

These features and advantages of the present invention as well as others will be more fully understood from the following description when read in light of the accompanying drawings, in which:

FIG. 1 is a diagrammatic illustration of apparatus to carry out one embodiment of the process according to the present invention; and FIG. 2 is a view similar to FIG. 1 but illustrating a second embodiment of apparatus to carry out the process of the present invention.

Referring to FIG. 1, there is illustrated an adsorber 1 for the removal of phenol from waste water through the use of an adsorbent consisting of particles having a desired or given nominal particle size. Typically, such particles are made from active carbon or aluminum oxide. The adsorber 1 includes a discharge device 2 for removing adsorbent particles together with conveying liquid from the adsorber. The discharge device 2 is of the type that is well known in the art and may take the form of an apparatus for continuously withdrawing solids of the type disclosed in U.S. Pat. No. 4,005,016 which issued on Jan. 25, 1977 to the Assignee of this invention. The disclosure by this patent is incorporated herein by reference thereto. A mixture of conveying liquid and adsorbent particles conveyed from the discharge device 2 is fed by a pump 3 to a separator screen device 4. The screen of the device 4 has a mesh size so as to define a gap width which is predetermined so that an adsorbent particle fraction consisting of adsorbent particles having a size which is greater than 50% of the desired nominal particle size is retained on the screen and separated thereby. The retained part of adsorbent particles on the screen is fed through a proportioning device 5 into a fluidized-bed oven 6 where the adsorbent particles are regenerated by heating within the oven. The regenerated adsorbent particles are discharged from the oven into a pump receiver 7.

The fraction of adsorbent particles which passes through the screen device 4 together with the conveying fluid is fed to a second screen device 8 which includes a screen having a predetermined mesh size to provide a gap width such that an undersized adsorbent particle fraction consisting of particles having a size which is greater than 10% of the desired nominal particle size is retained on the screen and separated thereby. The retained fraction of adsorbent particles is passed from screen 8 through line 9 into a processing plant 10. In the processing plant, which may include grinding and compacting devices per se well known in the art, the undersized fraction of adsorbent particles is processed to provide adsorbent particles having the desired nominal particle size. The processed adsorbent particles are fed from the processing plant 10 into a silo 11 used to make up losses of adsorbent by adding corresponding amounts of adsorbent into the pump receiver 7. Regenerated and processed adsorbent particles are fed together from the pump receiver 7 by pump 12 through line 13 into adsorber 1.

The conveying water discharged from screen device 8 still contains dust-like adsorbent particles which are fed into a separator 14 wherein the adsorbent particles are separated from the water. The adsorbent particles recovered from the separator are discharged via lines 15 and 9 into the processing plant 10 where the adsorbent particles are processed together, if desired, with the undersized adsorbent particles. The purified conveying water recovered from separator 14 is returned through line 16 to the adsorber 1.

If, for example, the desired nominal particle size of adsorbent consists of particles having a length and diameter of 2 millimeters, the mesh size of the screen in screen device 4 is selected so as to provide a gap width of about 1 millimeter and the mesh size for the screen used in screen device 8 is selected to provide a gap width of 0.3 millimeter.

A second embodiment of apparatus for carrying out the process of the present invention is shown in FIG. 2 wherein adsorbent particles after withdrawal from adsorber 21 are fed through a discharge device 22 onto a screen of a screen separator 24. The mesh size of this screen is selected so that the gap width and adsorbent particle fraction consisting of particles having a size greater than 10% of the desired nominal particle size are separated and retained on the screen. If, for example, the desired adsorbent particle size is 2 millimeters as in the preceding example, the mesh size of the screen is selected so as to provide a gap width of 0.3 millimeter. The screened adsorbent particle fraction is passed from the screen separator through a receiver 25 into the fluidized-bed oven 26. After regeneration of the adsorbent in the oven by heating, the regenerated adsorbent is fed into a pump receiver 27. The regenerated adsorbent is fed from receiver 27 by pump 32 to a screen separator 28. The separator 28 includes two superimposed screens 28A and 28B, each having a different mesh size to provide different gap widths. The upper screen 28A has a mesh size so as to provide a gap width for retaining thereon by separation, adsorbent particles having a size which is greater than 50% of the desired nominal particle size. The lower screen 28B has a mesh size selected to retain an adsorbent particle fraction thereon, the particle size of which is greater than 15%, but less than 50%, of the desired nominal particle size. The mesh sizes of screens 28A and 28B are typically selected so that the screens define a gap width of 1 millimeter and 0.3 millimeter, respectively.

The adsorbent particles retained on screen 28A are discharged directly into the adsorber 21. The adsorbent particles retained on screen 28B are fed through line 29 into a processing plant 30 for conversion into particles of an adsorbent having the desired nominal particle size.

Conveying liquid is discharged from screen separators 24 and 28 and the processing plant 30. The conveying liquid from each source is conveyed into a precipitator 34. Since the conveying liquid received in the precipitator includes entrained dust-like particles of an adsorbent, a supply of precipitated adsorbent dust is recovered from the precipitator 34 and fed by line 29 to the processing plant 30. Purified water obtained from the precipitator is supplied by line 36 into the adsorber.

The adsorbent particles treated in the processing plant are supplied to silo 31 used to feed make-up quantities of adsorbent into receiver 27 so that losses of adsorbent can be compensated so as to compensate for losses of adsorbent through the use of the silo.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. In a process for removing phenol from waste water by passing phenol-bearing waste water through an adsorber filled with an adsorbent of active carbon or aluminum oxide having a desired given nominal particle size, the process for regenerating said adsorbent including the steps of:

discharging said adsorbent from said adsorber, draining waste water from the discharged adsorbent, separating the adsorbent into a first adsorbent fraction including adsorbent particles having said given nominal particle size and into an undersized second adsorbent fraction consisting of adsorbent particles having a size less than the given nominal particle size but a particle size which is greater than 10% of the given nominal particle size, feeding said first adsorbent fraction into a regenerator oven, regenerating the first adsorbent fraction by heating within said regenerator oven, feeding said undersized second adsorbent fraction into a processing plant, processing the undersized second adsorbent fraction in said processing plant until the processed adsorbent particles define said given nominal particle size, and returning said regenerated adsorbent particles together with said processed adsorbent particles into said adsorber.

2. The process according to claim 1 wherein said regenerator oven includes a fluidized-bed oven for said step of regenerating the first adsorbent fraction.

3. The process according to claim 1 wherein said draining waste water includes pumping adsorbent together with waste water from the adsorber onto a screen.

4. The process according to claim 1 wherein said separating the adsorbent includes pumping adsorbent after said discharging from the adsorber onto a first screen having a predetermined mesh size to obtain and include in said first adsorbent fraction absorbent particles having a particle size greater than 50% of said given nominal particle size, pumping adsorbent passed through said first screen onto a second screen having a predetermined mesh size to obtain said second adsorbent fraction, said process including the further step of returning waste water together with entrained adsorbent dust particles passed through said second screen to said adsorber for flushing with purified water.

5. The method according to claim 1 wherein said step of returning said regenerated adsorbent particles together with said processed adsorbent particles includes the step of separating such returned adsorbent particles into three parts consisting of a first part which is fed into said adsorber and comprising adsorbent particles having a particle size greater than 50% of said given nominal particle size, a second part which is fed into said processing plant and comprising adsorbent particles having a particle size greater than 15% but less than 50% of said given nominal particle size, and a third part comprising adsorbent particles having a particle size of not greater than 15% of said given nominal particle size for passage into said processing plant to undergo said processing.

6. The method according to claim 5 wherein said step of returning said regenerated adsorbent particles further includes treating said third part of adsorbent particles in a separator to obtain conveying fluid for return to said adsorber and to obtain adsorbent particles for feeding into said processing plant.

* * * * *